March 11, 1969  C. C. CLEVELAND  3,432,361
GALVANIC BATTERY ELECTRICAL CONTACT
Filed Dec. 27, 1961

INVENTOR.
CLARK C. CLEVELAND
BY
ATTYS.

# United States Patent Office 3,432,361
Patented Mar. 11, 1969

3,432,361
GALVANIC BATTERY ELECTRICAL CONTACT
Clark C. Cleveland, Bennington, Vt., assignor, by mesne assignments, to the United States of America as represented by the Secretary of the Navy
Filed Dec. 27, 1961, Ser. No. 162,608
U.S. Cl. 136—90
Int. Cl. H01m 17/06
2 Claims This invention relates generally to an improved electrochemical battery and more particularly to a new and improved arrangement of the various cell terminals in a spin fill reserved energizer utilized as a power source for a proximity fuze located in a projectile.

Prior art power supplies for a rotating proximity fuze generally utilize a carbon-zinc-chromic acid battery in which the electrical terminals were generally attached directly by welding or soldering to the thin battery plates and then brought to a terminal section or a plug board to be connected to the load device.

The prior art reserve energizers also provided a structure in which the inner edges of the cell electrodes were left open making it easily activated by flooding of the electrolyte after it was released. Due to the characteristics of the material in the electrodes and in the attaching connectors the electrolyte flooding over the electrodes did very little harm to the battery. As a result of the material and the restricted operating temperature, a shelf life of a rather short duration was considered satisfactory. In an attempt to provide a single reserve energizer for all types of missiles it soon became apparent that a battery must be provided that would operate over a very broad temperature range with a long shelf life. To meet these requirements, the lead lead-oxide fluoboric acid electrochemical battery was developed. With the more active electrochemical materials and an electrolyte with an increased conductivity, the battery design of the prior art was considered ineffective. The prior art battery was ineffective because of its bulky construction and the fact that any electrolyte wetting the adjacent sides of a single plate would cause a short circuit and generate undesirable voltage transients. The general purpose of this invention is to provide an electrochemical energizer for use in a projectile which embraces all the advantages of similarly employed spin-filled batteries and possesses none of the aforedescribed disadvantages.

To attain this, the present invention contemplates a spin-filled electrochemical energizer in which a unique arrangement of the cell sections are employed thereby insuring adequate filling of each section and providing a good electrical connection between the battery sections. The unique construction also provides a good electrical connection between the battery plates and the terminal connector assembly.

It is an object of this invention to provide a battery, or reserve energizer, for use as a power source in a proximity fuzing system for a projectile in which the entire cell stack and connectors are completely encapsulated except for a small fill channel in the encapsulating material whereby the electrolyte may have access to the battery cells.

Another object is to provide a power source for a proximity fuze in a projectile which is rendered effective by a relatively low setback force.

A further object is to provide a battery or reserve energizer which will insure a good electrical connection between the generating votage source and the connecting terminals.

A still further object is to provide an electrochemical battery which is capable of generating an electrical voltage without generating short circuits or a battery noise at the same time.

Another object is to provide an electrochemical battery, or reserve energizer, capable of rapid voltage rise time over an increased range of temperatures.

Yet another object is to provide a cell arrangement which may be filled with electrolyte from either of two channels.

Other objects and many of the attendant advantages of this invention will be readily appreciated as the same becomes better understood by reference to the following detailed description when considered in connection with the accompanying drawings in which like reference numerals designate like parts throughout the different figures thereof and wherein.

Figure 1:
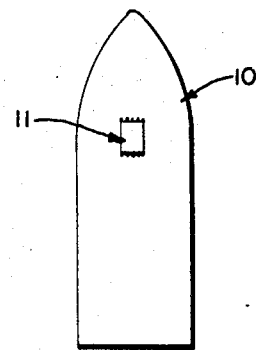
FIG. 1 illustrates a projectile in flight containing a reserve energizer employing the present invention.

In FIG. 1 there is illustrated a projectile indicated by numeral 10 within which is contained an electrochemical battery or reserve energizer 11, the axis of which is coincident with the spin axis of the projectile. As will be further illustrated herein the angle of flight of the projectile or the direction of spin is not considered important as the energizer is operative under all possible conditions.

Within the projectile, but not shown, is a proximity fuzing system requiring a suitable power source of the type disclosed herein requiring the voltage as generated by the power source.

Figure 2:
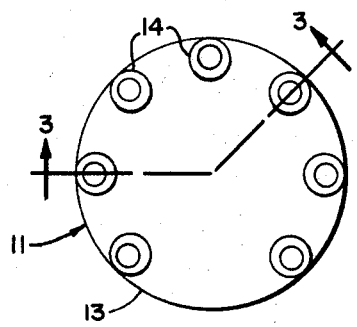
FIG. 2 is a plan view somewhat enlarged of a preferred embodiment of the invention.
Figure 3:
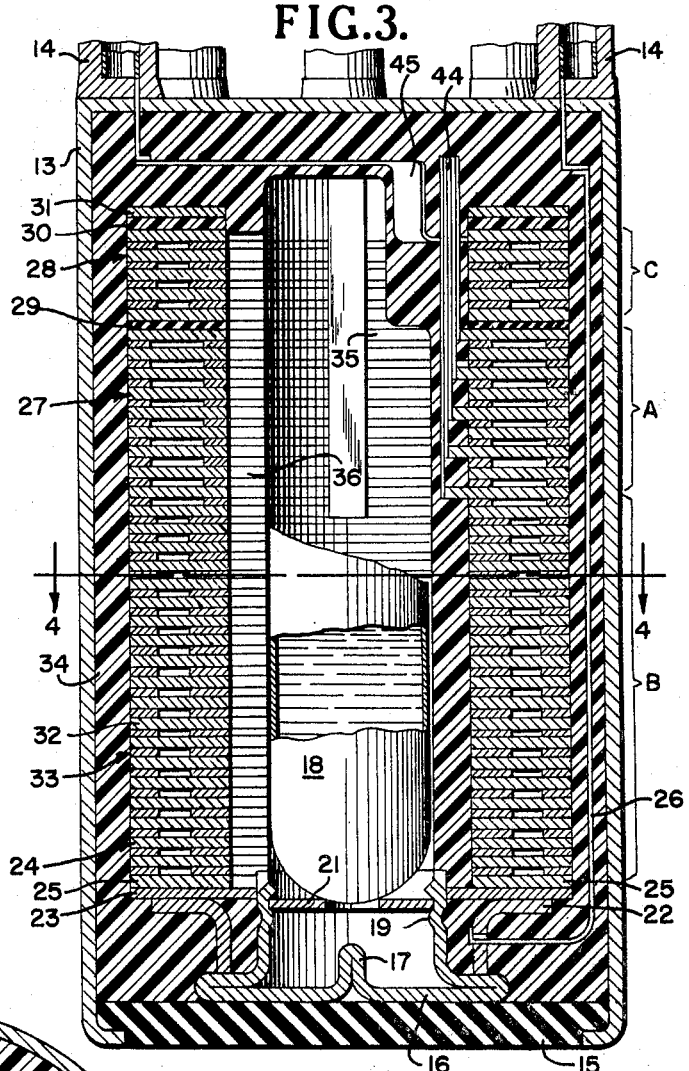
FIG. 3 is a greatly enlarged section of the energizer taken aong lines 3—3 of FIG. 2

FIG. 2 illustrates a plan view of the reserve energizer illustrating the battery casing 13 which is castellated to form a plurality of terminal means 14. The terminal means 14 provide a plurality of suitable connections to the electrical equipment contained within the projectile. The connector means may be of any suitable type, such for example, as plug-in connectors. The section of FIG. 3 is taken along lines 3—3 of FIG. 2 and illustrates the battery or reserve energizer in detail. FIG. 3 illustrates the battery case 13 and a base member 15 composed of a suitable molding compound, such for example as Plaskon. A breaker platform 16 is supported on base member 15 and has an anvil 17 formed therein for insuring fragmentation of the ampule 18 thereby releasing the electrolyte contained therein as will be further described therein. The breaker platform has the plurality of dimples 19 which hold the ampule support disc 21 in the position above the base platform. The dimples 19 and the ampule support disc 21 are so arranged that the frictional forces therebetween are sufficient to maintain the ampule support above the platform during normal handling and shipping but are insufficient to support the ampule under the setback forces which occur on firing the projectile. Carried by the breaker platform 16 is a stack support 22 and a cell support disc 23. The breaker platform 16 and the stack support 22 and the cell support disc 23 are each constructed of steel which has been plated with silver or cadmium to insure good electrical contact therebetween. A good connection is required since the B+ voltage will be obtained from this end of the battery.

Supported by the cell support disc 23 are a plurality of series connected cells 24 which may be any number depending on the desired voltage of the B section of battery 11. The bottom electrode plate 25 as viewed in FIG. 3, has lead oxide on one side and a nickel plate flashed over the steel body on the other side. The silver or cadmium plated support disc 23 makes electrical contact with the nickel plated side of the battery electrode.

Welded to the stack support 22 and in an electrical contact with the last cell of the B section is connector 26 which extends from this welded connection up the side of the battery incased in the encapsulated material to the castellated connector 14. It will be obvious to those having ordinary skill in the art that this solid connection to the B+ side of the battery will eliminate a source of battery noise generated by a flexible insecure connector generally located on the terminal plate of the battery. This small tab or weld generally utilized on the last electrode of the battery which often resulted in a high resistance connection has been eliminated, thus insuring that the B+ voltage will be delivered without battery noise or voltage drop due to a poor connection.

Adjacent the B section of the battery are a plurality of parallel connected cells 27 of any desired number which constitute the A section of the reserve energizer 11. Above the A section, as viewed in FIG. 3, is located a plurality of series connected cells 28 of any desired number and comprising the C section of energizer 11.

By constructing the B section adjacent to the A section the need for an insulating barrier generally located between the various sections is eliminated. Interposed between the C section and the A section is an insulating and reinforcing washer 29 which insulates the series connected C section from the parallel connected A section and further provides for an additional support to prevent warping of the individual cells.

Adjacent the upper cell of the C section is an insulating washer 30 made of any suitable material, for example, Vinylite and a stack height adjusting device 31 such as a steel washer which can be fabricated to any desired thickness.

The battery cells comprising of C, A, and B sections respectively are assembled by stacking the plates 32 and separators 33 in alternate order in a single stacking operation after which an elastomer molding compound 34 is applied to and completely incloses the entire cell stack except for an ampule cavity 35 and a full channel 36 interconnecting the various acting cell elements. The elastomer molding compound may be of a Vinylite base or any other compound suitable therefor. The stack may be encapsulated by the molding compound using any suitable operation, as is well-known in the art. The battery 11 of FIG. 4 utilizes annular shaped plates 32 of electrically conducting material, stacked at a right angle to the unit axis. The first plate 25, of FIG. 3 in the B section is coated with a nickel surface on the side abutting the cell support disc 23 and with a lead-oxide coating on the other surface thereof. Each of the annularly shaped plates 32 in the B and C sections is coated with lead on one flat surface thereof and a lead oxide coating on the other flat surface thereof. The annular plates 32 of the B and C sections are stacked in such a manner as to place the lead coated surface on one plate facing the lead oxide coating on the adjacent plate.

Figure 4:
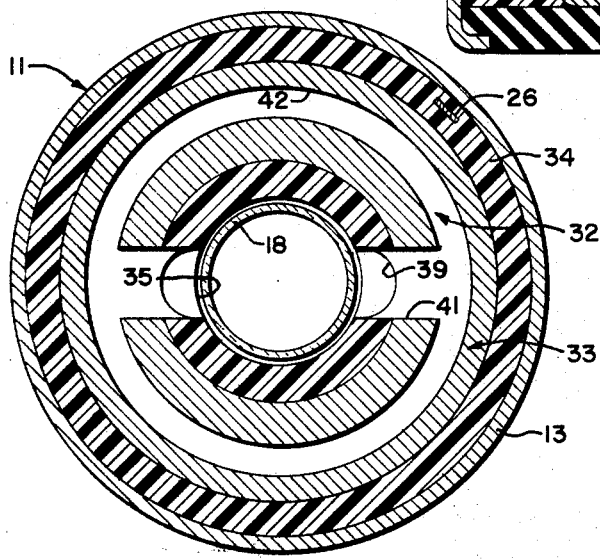
FIG. 4 is a plan view of the connecting washer taken along lines 4—4 of FIG. 3.

The annular shaped plates 32 have a pair of diametrically spaced scallops 39 of FIG. 4 along the interior diameter thereof. Interposed between each pair of plates 32 is a paper separator 33 having an entry port 41 and a cell channel 42 formed therein.

As can be seen in FIG. 3 the ground connections are made to a common terminal 44 and the various voltage terminals of the A, B and C sections are indicated by numerals 25 and 45, respectively. The construction of cells 27 making up the A section may be best understood by reference to FIG. 3. The cells of the A section are parallel connected, alternate plates have surfaces that are covered with a lead coating and the intermittent plates are coated with lead oxide. The paper separators 33 of the A sections are similar to those in the B and C sections.

Plates in the A section are further provided with leveling holes, not shown, to provide uniform distribution of the electrolyte therein. Since the cells of this section are parallel connected no adverse voltage transients are produced by intercommunication of the electrolyte within the cells.

The glass ampule 18 is filled with a suitable electrolyte, for example, fluoboric acid and is held within the ampule cavity of the frictional contact between the dimples 19 and the ampule support disc 21. This friction is sufficient to maintain the ampule above the breaker platform 16, as shown in FIG. 3 during normal handling and shipping of the device. When the projectile 10 is fired the setback forces due to the forward acceleration are sufficient to move the ampule support disc 21 past the friction contacts of dimples 19 thereby allowing the ampule 18 to strike the anvil 17 on the breaker platform 16 with sufficient force to break the ampule.

After the projectile leaves the muzzle of the gun the deceleration of the projectile allows the electrolyte to flow along the fill channels 36 and the spin of the projectile forces the electrolyte through the entry ports 41 into the cells to activate the battery.

The reserve energizer is filled with electrolyte from the bottom of the stack upward, as viewed in FIG. 3, in successive order except for some splash filling due to the splashing of the electrolyte during setback.

There has been shown and described a battery or reserve energizer for a proximity fuze system capable of being inserted within a projectile which provides a new and unique arrangement of the energizer cells to insure a more positive operation of the energizer and in which the setback forces of the projectile are provided by firing the projectile.

Obviously many modifications and variations of the present invention are possible in light of the above teachings. It is, therefore, to be understood, that within the scope of the appended claims, the invention may be practiced otherwise than as specifically described.

What is claimed and desired to be secured by Letters Patent of the United States is:

1. A reserve energizer for use as a power source in a spin type projectile comprising:
   an annular stack of plates including a first plurality of annular plates forming the B section of the energizer,
   a second plurality of annular plates forming the A section of the energizer,
   a third plurality of annular plates forming the C section of the energizer, said annular plates forming the B and C sections being coated with lead on one side and lead oxide on the other side,
   means supporting said first, second and third plurality of annular plates and for providing a terminal connection to the B section of the energizer,
   said means supporting including a stack support and a disc plated with one of a group of metals consisting of cadmium and silver, said disc being in electrical contact with said stack support and said B section of annular plates, said stack support being plated with one of a group of metals consisting of cadmium and silver, said stack support and said disc being plated with the same metal taken from each said group,
   an elastomer molding compound insulating material encapsulating said first, second and third plurality of annular plates,
   a cylindrical housing formed by said insulating material within a circular opening formed by said plurality of annular plates,
   an ampule containing a copius quantity of fluoboric acid electrolyte normally located in said cylindrical housing,
   a pair of diametrically opposed fill channels each wholly interrupting said insulating material and extending entirely through said insulating material in a direction normal to the plane of said plates, said channels located adjacent said inner periphery of the annular stack of plates for allowing the electrolyte to pass into the annular plates when released, and means for breaking the ampule and releasing the electrolyte in the cylindrical housing upon firing of the projectile whereby the electrolyte is forced along the fill channels into the annular stack by the spin of the projectile to activate the energizer.

2. The reserve energizer of claim 1 wherein the B and C sections are a plurality of series connected plates and the A section is a plurality of parallel connected plates.

References Cited

UNITED STATES PATENTS

| 2,931,849 | 4/1960 | Burrell | 136—90 |
| 2,981,778 | 4/1961 | Freund | 136—90 |
| 2,985,702 | 5/1961 | Darland et al. | 136—90 |

BENJAMIN R. PADGETT, *Primary Examiner.*

MICHAEL J. McGREAL, *Assistant Examiner.*